United States Patent [19]
Huss

[11] Patent Number: 6,158,327
[45] Date of Patent: Dec. 12, 2000

[54] EXTENDED WEAR PUMP DIAPHRAGM

[75] Inventor: Howard D. Huss, Westmoreland City, Pa.

[73] Assignee: Westinghouse Air Brake Company, Wilmerding, Pa.

[21] Appl. No.: 09/153,279

[22] Filed: Sep. 15, 1998

[51] Int. Cl.[7] ........................................................ F16J 3/02
[52] U.S. Cl. ......................... 92/100; 92/103 R; 92/103 F
[58] Field of Search ................................... 92/96, 99, 100, 92/103 SD, 103 F, 103 R

[56] References Cited

U.S. PATENT DOCUMENTS

| | | | |
|---|---|---|---|
| 5,437,219 | 8/1995 | Scott et al. ................................... | 92/96 |
| 5,996,470 | 12/1999 | Eady et al. ................................... | 92/99 |

*Primary Examiner*—Edward K. Look
*Assistant Examiner*—Thomas E. Lazo
*Attorney, Agent, or Firm*—James Ray & Associates

[57] ABSTRACT

The present invention provides a diaphragm for use in pump applications in which at least a predetermined portion of such diaphragm is in contact with such outer piston which would tend to abrade such diaphragm. Such diaphragm is formed from at least one layer of a preselected flexible material. Such diaphragm comprises an outer bead like portion for securing the diaphragm to a pump housing. There is a annular flexure portion having a first end and a second end, such first end and such second end being generally flat and an arcuate shaped middle portion formed contiguously with the first end and the second end. Such first end is formed contiguously with the outer bead like portion. Such annular flexure portion has a substantially uniform first predetermined thickness. An enlarged bulbous portion is formed contiguously with the second end and extends around an inner periphery thereof. Such enlarged bulbous portion has a predetermined configuration. Such diaphragm has an enlarged section formed as a protrusion that extends outwardly from an outer surface of the generally flat second end. Such enlarged section is formed contiguously with the enlarged bulbous portion and extends around an outer periphery thereof. The enlarged section causes the second end to be thicker than such first predetermined thickness. Further, there is a generally flat center portion that is formed contiguously with the enlarged bulbous portion and extends around an inner periphery thereof.

14 Claims, 2 Drawing Sheets

EXTENDED WEAR PUMP DIAPHRAGM

FIELD OF THE INVENTION

The present invention relates, in general, to diaphragms which are subjected to detrimental wear during service due to abrasion caused by contact with nonflexing type surfaces which move relative to such diaphragms when used in pumps and pumping systems and, more particularly, this invention relates to diaphragms that have been modified to substantially reduce such abrasion and wear in the area of the diaphragm that is in contact with the nonflexing surfaces where wear is most likely to occur.

BACKGROUND OF THE INVENTION

As is generally well known in the prior art, diaphragms are an integral part of pumps. It is necessary in these applications for the diaphragms to be flexible in order for them to perform their intended function. However, the constant flexing of certain portions of the diaphragm when the pump is in use creates stresses on the nonflexing portions of the diaphragm that are attached to the pump.

In these type pumps there is a follower and flange which support the diaphragm and help to secure it in place within the pump housing. These areas of the diaphragm which are in movable contact with these followers and flanges will normally exhibit rather severe wear and, after extended use with the constant flexing of the diaphragm, will eventually crack and/or have holes wear through the diaphragm. When this occurs the pump is out of commission until a new diaphragm can be installed to replace the worn out diaphragm.

In many cases the rest of the diaphragm is still in relatively good shape. It is primarily at the wear points of such diaphragm caused by the relative movement between the diaphragm and the follower and flange members, under normal circumstances, that the diaphragm will reveal major problems. The replacement of the diaphragm, however, is only one of the problems that maintenance personnel encounter. The location of many pumps is such that not only may they be very difficult to get to but, even after reaching the pump, performing the work of replacing a diaphragm can and oftentimes does present a real challenge.

Thus, the longer a pump can be kept in operation, without the need for servicing, represents a considerable savings in not only the maintenance personnel's time but in the "up" time for whatever operation the pump is being used. Any improvement in the design of the diaphragm that can significantly increase its usable life expectancy is a welcome improvement.

The present invention is specifically related to improving the wear characteristics of a diaphragm at the aforementioned stress points at the follower and flange areas of the diaphragm.

SUMMARY OF THE INVENTION

The present invention provides a diaphragm for use in pump applications in which at least a predetermined portion of such diaphragm is in contact with such outer piston which would tend to abrade such diaphragm. Such diaphragm is formed from at least one layer of a preselected flexible material. Such diaphragm comprises an outer bead like portion for securing the diaphragm to a pump housing. The outer bead like portion has a first predetermined configuration. There is a annular flexure portion having a first end and a second end, such first end and such second end of the flexure annular portion being generally flat. Such annular flexure portion further has an arcuate shaped middle portion that is formed contiguously with the first end and the second end. Such first end of the flexure annular portion is formed contiguously with the outer bead like portion and extends around an inner periphery thereof. Such annular flexure portion has a substantially uniform first predetermined thickness. An enlarged bulbous portion is formed contiguously with the second end of the annular flexure portion and extends around an inner periphery thereof. Such enlarged bulbous portion has a second predetermined configuration. Such diaphragm has an enlarged section formed as a protrusion and extending outwardly from an outer surface of the generally flat second end of the annular flexure portion. Such enlarged section is formed contiguously with the enlarged bulbous portion and extends around an outer periphery thereof. The enlarged section formed as such protrusion on the generally flat second end of the flexure annular portion effects the second end of the annular flexure portion so as to be thicker than the first predetermined thickness. The enlarged section formed as a protrusion on the generally flat second end of the annular flexure portion being less than one half the thickness of the first predetermined thickness. Further, there is a generally flat center portion having substantially a uniform second predetermined thickness. The generally flat center portion is formed contiguously with the enlarged bulbous portion and extends around an inner periphery thereof. An aperture, having a second predetermined diameter, is formed through and substantially in a diametric center of the generally flat center portion for receiving a piston rod.

OBJECTS OF THE INVENTION

It is, therefore, one of the primary objects of the present invention to provide an improved diaphragm that will resist significant wear at least around the periphery of the follower and/or flange area where such diaphragm is most susceptible to wear.

Another object of the present invention is to provide an improved diaphragm which will exhibit improved wear by increasing the thickness of the diaphragm in such follower and/or flange area so that such follower and/or flange will not be in rubbing contact with that portion of the diaphragm that is subjected to flexing.

Additionally, it is an object of the present invention to provide an improved diaphragm which is resistant to abrasive wear and that would be ready for use after molding without any significant additional processing.

Yet another object of the present invention is to provide an improved diaphragm which is relatively easy and inexpensive to manufacture.

A further object of the present invention is to provide an improved diaphragm which will significantly reduce the downtime of the pump in which such diaphragm is used thereby providing increased productivity.

Still yet another object of the present invention is to provide an improved diaphragm which can be manufactured in a number of different sizes and from a number of different materials without adversely affecting operating performance of such diaphragm.

In addition to the several objects and advantages of the present invention which has been described in some detail above, various other objects and advantages of the invention will become much more readily apparent to those persons who are skilled in pumping systems and, more particularly, to diaphragms used in such pumps from the following more detailed description of such invention, particularly, when such detailed description is taken in conjunction with the attached drawing Figures and with the appended claims.

Figure 1:
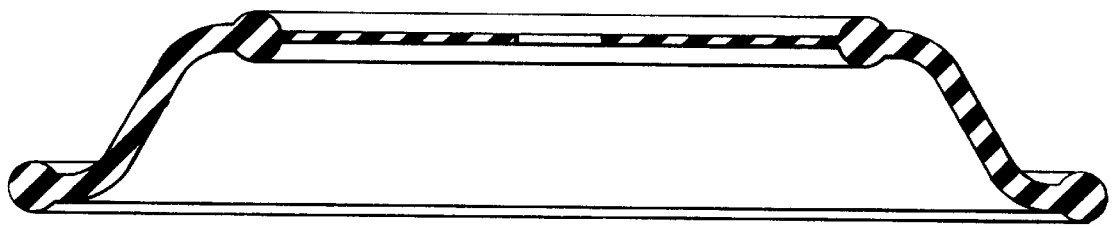
FIG. 1 is a cross-sectional view of a prior art diaphragm.

BRIEF DESCRIPTION OF THE PRESENTLY PREFERRED AND VARIOUS ALTERNATE EMBODIMENTS OF THE INVENTION

Prior to proceeding to the more detailed description of the present invention, it should be noted that for the sake of clarity in understanding the invention, identical components with identical functions have been designated with identical reference numerals throughout the drawing Figures.

Figure 2:
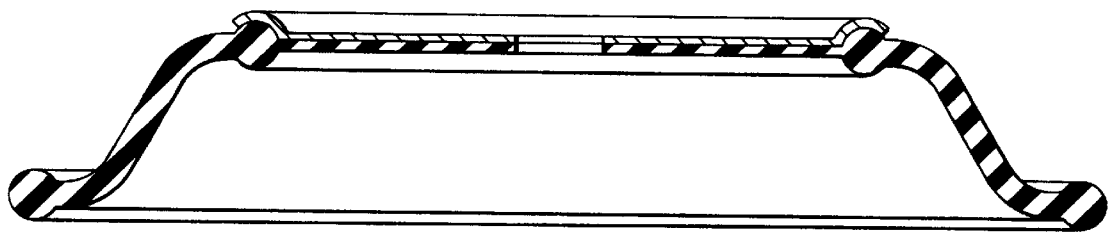
FIG. 2 is a cross-sectional view of a prior art diaphragm showing the position of an outer piston.
Figure 3:
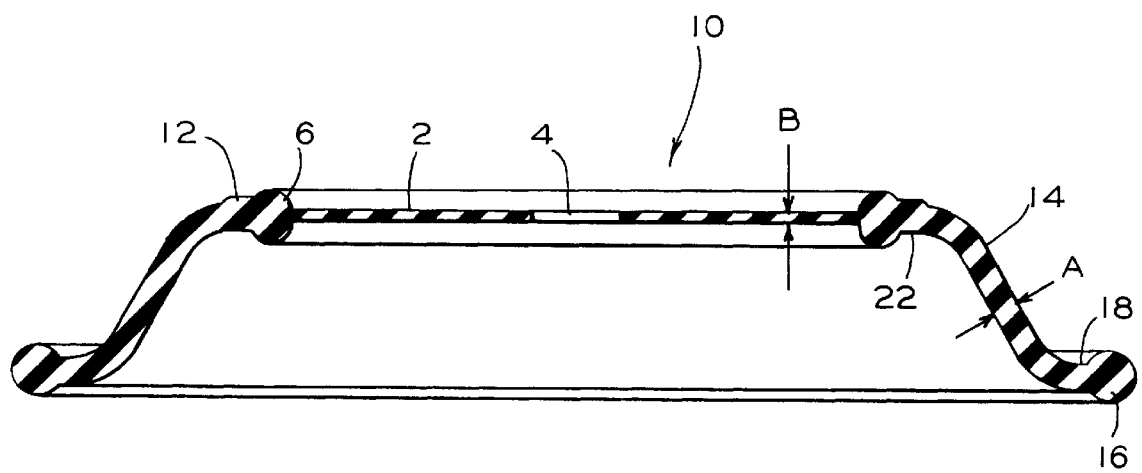
FIG. 3 is an cross-sectional view of a diaphragm showing an embodiment of the present invention.
Figure 4:
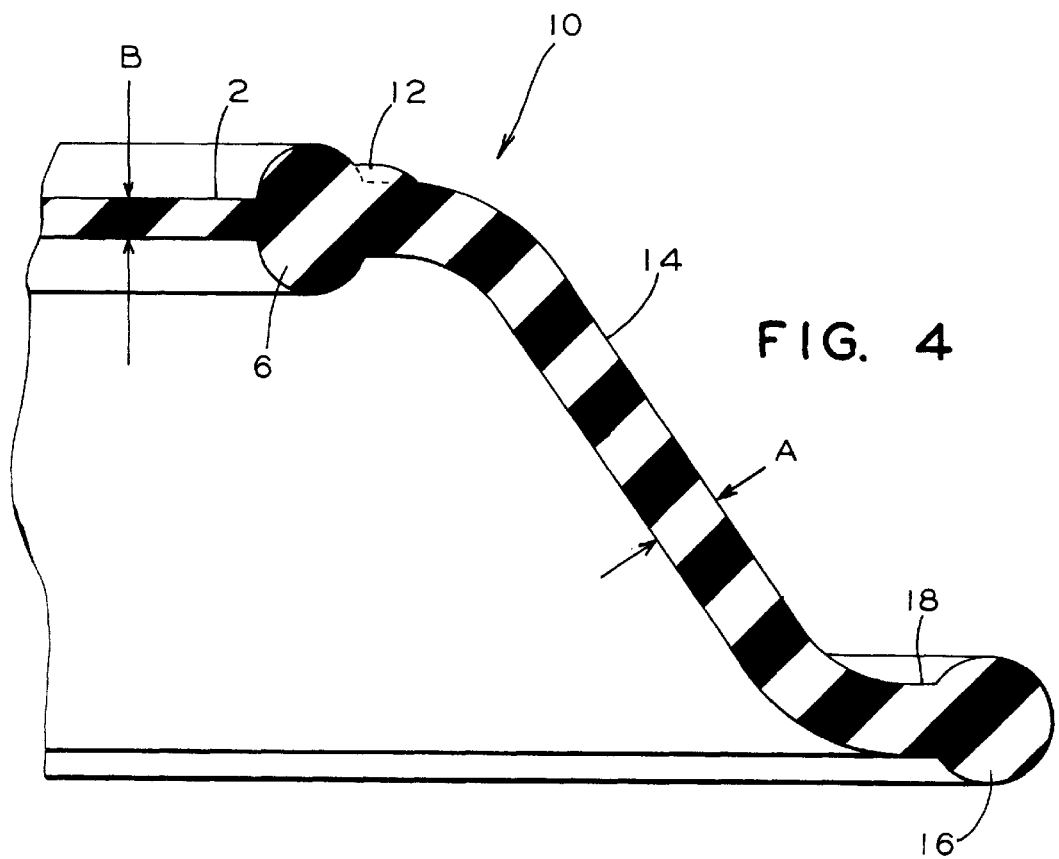
FIG. 4 is an enlarged cross-sectional view of a portion of the diaphragm of FIG. 3 showing an embodiment of the present invention.

Illustrated in FIGS. 1 and 2 are cross-sectional views of a diaphragm as used in prior art, with FIG. 2 including an outer piston. FIGS. 3 and 4 depict a diaphragm, generally designated 10, showing the embodiment of the present invention.

Such diaphragm 10 has an outer bead like portion 16. Such outer bead like portion 16 has a first predetermined configuration and is used to secure diaphragm 10 to a pump housing (not shown). In a presently preferred embodiment of the invention such first predetermined configuration is generally round.

Diaphragm 10 has a annular flexure portion 14 having a first end 18 and a second end 22. First end 18 and second end 22 of such annular flexure portion 14 are generally flat. The annular flexure portion further has a generally conical shaped middle portion having ends that are generally arcuately shaped is formed contiguously with the first end 18 and the second end 22. Such first end 18 of annular flexure portion 14 is formed contiguously with the outer bead like portion 16 and extends around an inner periphery thereof. Annular flexure portion 14 has a substantially uniform first predetermined thickness A.

There is an enlarged bulbous portion 6 that is formed contiguously with the second end 22 of the annular flexure portion 14 and extends around an inner periphery thereof. Such enlarged bulbous portion 6 has a second predetermined configuration. In a presently preferred embodiment of the invention such second predetermined configuration is elliptical. It is also presently preferred that the height of such elliptically shaped bulbous portion 6 taken on an axis that is parallel to an axis taken along such piston rod is longer than is a width of such bulbous portion taken on an axis that is transverse to such axis parallel to such piston rod.

Diaphragm 10 has an enlarged section 12 formed as a protrusion and extending outwardly from an outer periphery of the generally flat second end 22 of the annular flexure portion 14. The enlarged section 12 is formed contiguously with such enlarged bulbous portion 6 and extends around an outer periphery thereof. Such enlarged section 12 that is formed as a protrusion on such generally flat second end 22 of the annular flexure portion 14 effects the second end 22 of the annular flexure portion 14 so that it is thicker than such first predetermined thickness A. In a presently preferred embodiment of the invention, such thickness of such enlarged tapered section 12 is less than half of the predetermined thickness A.

Diaphragm 10 further has generally flat center portion 2 having a substantially uniform second predetermined thickness B. Generally flat center portion 2 is formed contiguously with the enlarged bulbous portion 6 and extends around an inner periphery thereof. There is also an aperture 4, having a second predetermined diameter, that is formed through and substantially in a diametric center of the generally flat center portion 2 for receiving a piston rod.

In a preferred embodiment of the invention, such enlarged section 12, that is formed as a protrusion and extends outwardly from an outer periphery of the generally flat second end 22 of such annular flexure portion 14, has a tapered portion. Such enlarged section 12 is thickest where the second end 22 of generally conical shaped annular flexure portion 14 abuts such enlarged bulbous portion 6 and is thinnest at an opposite end of the generally flat second end 22 of annular flexure portion 14. It is presently preferred that enlarged section 12 has a generally flat portion where the second end 22 of generally arcuate shaped annular flexure portion 14 abuts such enlarged bulbous portion 6 and then a tapered portion at an opposite end of the generally flat second end 22.

When such diaphragm 10 is installed in a pump, the outer portion or fluid side of the diaphragm 10 is secured to the piston rod by an outer piston shown in prior art FIG. 2. The inner surface or air side of the diaphragm is secured to such piston rod by an inner piston (not shown). Such outer piston is also referred to as a follower or outer follower and such inner piston is also referred to as a flange or inner follower.

As is evident in prior art FIG. 2, such outer piston generally follows the shape of diaphragm 10 as it extends across generally flat center portion 2, has a portion that encircles such bulbous portion 6 and ends just outside the bulbous portion. When diaphragm 10 is in operation and annular flexure portion 14 is being flexed such outer piston comes in contact with such diaphragm 10 at the area designated as generally flat second end 22 of annular flexure portion 14. This area receives the greatest abrasive wear because of the repeated contact and release with such outer piston. In the presently preferred embodiment of the invention such generally flat second end 22 of the generally conical shaped flexure annular portion 14 has been modified to include enlarged section 12. The thickness in this area is increased over such prior art diaphragms. Thus the portion of the diaphragm that is exposed to the greatest abrasive wear is made thicker which enables the diaphragm 10 to better resist the abrasion caused by the outer piston. The embodiment of the present invention significantly extends the useful service life of a diaphragm.

Although enlarged section 12 is designated as a separate section for the purpose of describing the difference over prior art diaphragms, in the molding of the diaphragm it is formed as an integral part and not as a separate extension.

It is evident that the thickness of the generally flat second end 22 of the flexure annular portion 14 is greater than thickness A of the rest of such annular flexure portion 14 since it has thickness A plus the thickness of enlarged section 12. In a presently preferred embodiment of the invention such thickness A is greater than thickness B of the generally flat center portion 2.

The diaphragm 10 is formed from at least one layer of a preselected flexible material. Such preselected flexible material is selected from a group including natural rubber, synthetic rubbers, EPDM and fluoroelastomers. Such preselected flexible material may also include a inner fabric layer as reinforcement. In a preferred embodiment of the invention such preselected flexible material includes such fabric reinforcement. It is also presently preferred that such fabric reinforcement be nylon. It is within the embodiment of the invention that such diaphragm may be comprised of two layers of two different materials together with a fabric inner layer.

While a presently preferred and an alternative embodiment of the present invention have been described in detail above, it should be understood that various other adaptations and/or modifications of the present invention can be made by those persons who are particularly skilled in the art related to pumping systems and, more particularly, diaphragms used in such pumping systems without departing from either the spirit of the invention or the scope of the appended claims.

I claim:

1. A diaphragm used in pump applications in which at least a predetermined portion of said diaphragm is in contact with an outer piston which would tend to abrade said diaphragm, said diaphragm formed from at least one layer of a preselected flexible material, said diaphragm comprising:
   (a) an outer bead like portion for securing said diaphragm to a pump housing, said outer bead like portion having a first predetermined configuration;
   (b) an annular flexure portion, said annular flexure portion including;
      (i) a first relatively short, flat-like portion having a first end formed contiguously with said outer bead like portion and extending around an inner periphery thereof,
      (ii) a first generally arcuately shaped portion having a first end formed contiguously with a second end of said first relatively short, flat-like portion and extending around an inner periphery thereof,
      (iii) a generally conical shaped middle portion having a first end formed contiguously with a second end of said first generally arcuately shared portion and extending around a periphery thereof,
      (iv) a second generally arcuately shaped portion having a first end formed contiguously with a second end of said generally conical shaped middle portion and extending around another periphery thereof, and
      (v) a second relatively short, flat-like portion having a first end formed contiguously with a second end of said second generally arcuately shaped portion and extending around a periphery thereof, said annular flexure portion having a substantially uniform first predetermined thickness;
   (c) an enlarged bulbous portion formed contiguously with a second end of said second relatively short, flat-like portion of said annular flexure portion and extending around an outer periphery thereof, said enlarged bulbous portion having a second predetermined configuration;
   (d) an enlarged section formed as a protrusion and extending outwardly from only an outer surface of said second relatively short, flat-like portion of said annular flexure portion, said enlarged section formed contiguously with said enlarged bulbous portion and extending around an outer periphery thereof, said enlarged section formed as said Protrusion on said second relatively short, flat-like portion of said annular flexure portion effecting said second relatively short, flat-like portion of said annular flexure portion to be thicker than said first predetermined thickness, said enlarged section formed as said protrusion on said second relatively short, flat-like portion of said flexure annular portion being less than one half a thickness of said first predetermined thickness, said enlarged section in contact with an end of such outer piston;
   (e) a generally flat center portion having a substantially uniform second predetermined thickness, said generally flat center portion formed contiguously with said enlarged bulbous portion and extending around an inner periphery thereof; and
   (f) an aperture, having a second predetermined diameter, formed through and substantially in a diametric center of said generally flat center portion for receiving a piston rod.

2. A diaphragm used in pump applications, according to claim 1, wherein said first predetermined configuration is generally round.

3. A diaphragm used in pump applications, according to claim 1, wherein said second predetermined configuration is generally elliptical.

4. A diaphragm used in pump applications, according to claim 1, wherein said enlarged section formed as a protrusion and extending outwardly from an outer periphery of said generally flat second end of said annular flexure portion includes a tapered portion.

5. A diaphragm used in pump applications, according to claim 4, wherein said enlarged section formed as a protrusion and extending outwardly from an outer periphery of said generally flat second end of said flexure annular portion is thickest where said second end of said flexure annular portion abuts said enlarged bulbous portion and thinnest at an opposite end of said generally flat second end of said flexure annular portion.

6. A diaphragm used in pump applications, according to claim 1, wherein said preselected flexible material is selected from a group including natural rubber, synthetic rubbers, EPDM, fluoroelastomers and various mixtures thereof.

7. A diaphragm used in pump applications, according to claim 6, wherein said preselected flexible material is nitrile.

8. A diaphragm used in pump applications, according to claim 6, wherein said preselected flexible material is neoprene.

9. A diaphragm used in pump applications, according to claim 6, wherein said preselected flexible material is EPDM.

10. A diaphragm used in pump applications, according to claim 6, wherein said preselected flexible material is a fluoroelastomer.

11. A diaphragm used in pump applications, according to claim 6, wherein said preselected flexible material further includes at least one layer of a fabric type reinforcement.

12. A diaphragm used in pump applications, according to claim 11, wherein said fabric reinforcement is nylon.

13. A diaphragm used in pump applications, according to claim 1, wherein said diaphragm includes at least two layers of a preselected flexible material.

14. A diaphragm used in pump applications, according to claim 13, wherein a first one of said at least two layers of said flexible material is selected from a first one of a group including natural rubber, synthetic rubbers, EPDM and fluoroelastomers and a second one of said at least two layers of said flexible material is selected from a second one of said group including natural rubber, synthetic rubbers, EPDM and fluoroelastomers.

* * * * *